(12) United States Patent
Miyao et al.

(10) Patent No.: US 6,808,796 B1
(45) Date of Patent: Oct. 26, 2004

(54) CONTINUOUS REINFORCING FIBER SHEET AND MANUFACTURING METHOD THEREOF

(75) Inventors: Makiji Miyao, Tokyo (JP); Toshikazu Takeda, Tokyo (JP); Shinkichi Murakami, Tokyo (JP)

(73) Assignees: Nippon Steel Composite Co., Ltd., Tokyo (JP); Nippon Steel Corporation, Tokyo (JP)

(*) Notice: Subject to any disclaimer, the term of this patent is extended or adjusted under 35 U.S.C. 154(b) by 22 days.

(21) Appl. No.: 09/713,000

(22) Filed: Nov. 17, 2000

(30) Foreign Application Priority Data

May 30, 2000 (JP) .................................... 2000-161295

(51) Int. Cl.⁷ ..................... D04H 5/00; B32B 27/12; B32B 18/00; B32B 17/02; B32B 27/04; B32B 5/12

(52) U.S. Cl. .................. 428/292.1; 428/113; 428/221; 428/299.1; 428/299.4; 428/299.7; 428/300.7; 428/301.4

(58) Field of Search ........................ 428/299.1, 299.4, 428/299.7, 300.7, 301.4, 113, 292.1, 411.1, 90, 221; 52/DIG. 7, 309.16, 309.17, 649.1

(56) References Cited

U.S. PATENT DOCUMENTS

| | | | | |
|---|---|---|---|---|
| 4,098,943 A | * | 7/1978 | Degginger et al. | 428/283 |
| 4,214,932 A | * | 7/1980 | Van Auken | 156/187 |
| 5,194,462 A | * | 3/1993 | Hirasaka et al. | 524/13 |
| 5,294,394 A | * | 3/1994 | Sakai et al. | 264/135 |
| 5,316,834 A | * | 5/1994 | Matsuda et al. | 428/233 |
| 5,326,630 A | * | 7/1994 | Saito et al. | 428/231 |
| 5,635,263 A | * | 6/1997 | Saito | 428/40.1 |
| 6,183,835 B1 | * | 2/2001 | Cho et al. | 428/113 |
| 6,238,761 B1 | * | 5/2001 | Jeong et al. | 428/41.8 |

FOREIGN PATENT DOCUMENTS

EP    WO99/04967    * 4/1999

* cited by examiner

Primary Examiner—B. Hamilton Hess
Assistant Examiner—C Thompson
(74) Attorney, Agent, or Firm—Drinker Biddle & Reath LLP

(57) ABSTRACT

A continuous reinforcing fiber sheet in which reinforcing fibers are arranged at an arbitrary angle to the main axis. The continuous reinforcing fiber sheet is well applicable to pultrusion forming without the risk of the reinforcing fibers being dispersed. This permits use of the continuous reinforcing fiber sheet in a long fiber-reinforced plastic structural member having remarkably improved torsional rigidity. The continuous reinforcing fiber sheet 1 has a continuous resin-penetrable support sheet 2 and a reinforcing fiber layer 3 held by the resin-penetrable support sheet 2. Long reinforcing fibers 4 in the reinforcing fiber layer 3 have substantially a certain length (F) and are arranged in the longitudinal direction of the resin-penetrable support sheet 2 at a prescribed angle (α) to the longitudinal direction of the resin-penetrable support sheet 2.

6 Claims, 9 Drawing Sheets

CONTINUOUS REINFORCING FIBER SHEET AND MANUFACTURING METHOD THEREOF

BACKGROUND OF THE INVENTION

1. Field of the Invention

The present invention relates to a continuous reinforcing fiber sheet which is well applicable as an intermediate base material or a structural member for an FRP-formed product, or as a reinforcing member for a metal tube post or a plastic pipe used for an illuminating pole, a sign pole or an electric pole, or as a reinforcing member for a civil engineering or building structure and which permits the improvement of torsional rigidity, and a manufacturing method of the continuous reinforcing fiber sheet.

2. Description of the Related Art

When producing a wing or a fuselage of an airplane, a blade of a windmill, or a large-scale structure such as a ship or an automobile, it is the recent practice to use, for example, I-shaped, H-shaped, T-shaped, L-shaped, rod or shaft-shaped, or pipe or tube-shaped continuous long fiber reinforced plastic structural members.

Such a long fiber reinforced plastic structural member can be produced by the so-called pultrusion process which comprises impregnating a unidirectional reinforcing fiber sheet having reinforcing fibers arranged along the main axis direction with a matrix resin, and continuously feeding the resultant impregnated sheet to a mold for forming the sheet.

The long fiber reinforced plastics can be formed also by preparing a prepreg by impregnating the reinforcing fiber sheet with a hot-melt epoxy resin, and continuously heating and pressing a plurality of such prepregs in lamination into a prescribed shape.

However, the thus formed fiber reinforced plastic structural member, which permits the achievement of desired bending strength and rigidity, has a problem of a poor torsional rigidity because it is a formed product of unidirectional fibers.

It is therefore the conventional practice to affix the reinforcing fiber sheet prepared by arranging the reinforcing fibers in, for example, a 45°-direction onto a fiber reinforced plastic structural member.

The continuous reinforcing fiber sheet comprising the reinforcing fibers arranged in, for example, a 45°-direction to the main axis is not however existent at present, and it has been impossible to prepare a continuous molded product having an increased torsional rigidity by a forming method such as the pultrusion process.

There is available also a method of winding the reinforcing fibers around the fiber reinforced plastic structural member by means of an overwinder. It is however impossible to prepare an I-shaped or H-shaped fiber reinforced plastic structural member.

The torsional rigidity may also be improved by using a chopped strand mat of carbon fibers or glass fibers upon the pultrusion. However, the resultant product is seriously poor in the modulus of elasticity as compared with the case where the reinforcing fiber sheet comprising the reinforcing fibers arranged in a 45°-direction is used. A sufficient torsional rigidity cannot therefor be obtained.

It is not impossible, as shown in FIG. 11, to join together a plurality of reinforcing fiber sheets 102 prepared by cutting a reinforcing fiber sheet 100 made by arranging reinforcing fibers 101 in one direction so that the reinforcing fibers 101 are oriented at a prescribed angle such as 45°, and to use the resultant product in the pultrusion process.

In this case, however, the joining of the plurality of reinforcing fiber sheets 102 causes the overlapping of the joints of the reinforcing fiber sheets or produces the steps thereof. The thus formed fiber reinforced plastic structural member cannot therefore obtain a sufficient satisfaction in quality.

As a result of extensive studies and experiments, the present inventors obtained the following findings, as described later in detail. By arranging the reinforcing fibers of a prescribed length at a prescribed angle such as 45° to the main axis on a continuous mesh-shaped support sheet, and adhering and holding them with the mesh-shaped support sheet, it is possible to suitably prepare the continuous reinforcing fiber sheet in which the reinforcing fibers are arranged at an angle of 45°; the continuous reinforcing fiber sheet having such a configuration is well applicable for the pultrusion process without the risk of the reinforcing fibers being dispersed into pieces; and it is possible to prepare the long fiber reinforced plastic structural member having a remarkably improved torsional rigidity.

In the continuous reinforcing fiber sheet having the configuration described above, the reinforcing fibers can be fixed in one direction at laps when winding it around a tubular product such as a pipe, thus permitting the remarkable improvement of the torsional rigidity.

The continuous reinforcing fiber sheet of the aforementioned configuration can serve as the continuous reinforcing fiber sheet having the reinforcing fibers oriented in a counter direction by reversing. It is therefore easy to laminate a plurality of layers symmetrically (symmetric lamination), whereby the conventional problem of bending upon the heating and forming of the sheet can be completely solved.

The present invention was developed on the basis of these new findings obtained by the present inventors.

SUMMARY OF THE INVENTION

It is therefore an object of the present invention to provide a continuous reinforcing fiber sheet, having reinforcing fibers arranged at an arbitrary angle to the main axis, which permits the use for pultrusion without the risk of the reinforcing fibers of being dispersed, and the preparation of a long fiber reinforced plastic structural member having a remarkably improved torsional rigidity, and a manufacturing method thereof.

Another object of the invention is to provide a continuous reinforcing fiber sheet which, when winding the same around an object of reinforcement such as a pipe for reinforcement, permits satisfactory fixing at lap portions in the circumferential direction, and improvement of torsional rigidity of the object of reinforcement, and a manufacturing method thereof.

Still another object of the invention is to provide a continuous reinforcing fiber sheet which permits the easy symmetric lamination of a plurality of layers of such fiber sheet (symmetric lamination), and completely resolves the problem of the bending occurred during the heating and forming thereof, and a manufacturing method thereof The aforementioned objects of the invention can be achieved by the continuous reinforcing fiber sheet and the manufacturing method thereof of the invention. In summary, according to a first aspect of the invention, there is provided a continuous reinforcing fiber sheet which has not yet been impregnated with a resin, in the form of a continuous sheet shape. The continuous reinforcing fiber sheet comprises at least one continuous resin-penetrable support sheet, and a reinforcing fiber layer held by the resin-penetrable support sheet. The reinforcing fiber layer comprises reinforcing fibers which are long fibers having substantially a certain length arranged at a prescribed angle to the longitudinal direction of the resin-penetrable support sheet, and along the longitudinal direction of the resin-penetrable support sheet. The continuous reinforcing fiber sheet of the invention has a width within a range of from 10 to 150 cm and a longitudinal length of at least 10 m. According to an embodiment of the invention, the reinforcing fibers are arranged substantially at 45° to the longitudinal direction of the resin-penetrable support sheet. According to still another embodiment of the invention, for the aseismatic reinforcement of a reinforced concrete column for civil engineering or building purposes, the continuous reinforcing fiber sheet can be adhered to the column with the reinforcing fibers substantially at an angle of 45° to the longitudinal direction of the concrete column.

According to a second aspect of the invention, there is provided a multi-layer-shaped continuous reinforcing fiber sheet comprising two or more continuous reinforcing fiber sheets laminated into an integral sheet. According to an embodiment of this aspect of the invention, at least one such resin-penetrable support sheet is interposed between the laminated continuous reinforcing sheets. According to another embodiment of the invention, the reinforcing fibers forming a reinforcing fiber layer of each of the continuous reinforcing fiber sheets are arranged in a direction relative to the longitudinal direction of the resin-penetrable support sheets and at an angle, or, the reinforcing fibers forming the reinforcing fiber layer of each of the continuous reinforcing fiber sheets are oriented in a direction different from the longitudinal direction of the resin-penetrable support sheet.

According to a third aspect of the invention, there is provided a continuous reinforcing fiber sheet prepreg, wherein the continuous reinforcing fiber sheet is impregnated with a resin.

According to a fourth aspect of the invention, there is provided a manufacturing method of a continuous reinforcing fiber sheet in the form of a continuous sheet shape, which has not yet been impregnated with a resin, comprising the steps of:

(a) continuously supplying at least one resin-penetrable support sheet;

(b) supplying reinforcing fibers which are long fibers having substantially a certain length at a prescribed angle to the longitudinal direction of the resin-penetrable support sheet; and (c) heating and pressing the resin-penetrable support sheet and a reinforcing fiber layer formed with the reinforcing fibers and laminated with the resin-penetrable support sheet. According to an embodiment of this aspect of the invention, the above mentioned step (b) is accomplished by winding the reinforcing fiber sheet formed by arranging the reinforcing fibers in a direction spirally around the resin-penetrable support sheets supplied continuously. The resin-penetrable support sheets are arranged on both sides of a sheet of release paper. The reinforcing fiber sheet heated, pressed and spirally wound around the resin-penetrable support. sheets arranged on both sides of the release paper is cut at both edge positions in the longitudinal direction of the sheet, making into two sheets.

According to an embodiment of the aforementioned aspects of the invention, the continuous resin-penetrable support sheet can be provided on a side or on both sides of the reinforcing fiber layer. According to another embodiment, the resin-penetrable support sheets are a mesh-shaped sheet or cloth. According to still another embodiment, the mesh-shaped sheet is a biaxial mesh-shaped sheet formed by warps in the same direction as the longitudinal direction of the continuous reinforcing fiber sheet and wefts at right angles to the warps.

According to another embodiment of this aspect of the invention, the reinforcing fibers forming the reinforcing fiber layer are selected from the group consisting of PAN-based or pitch-based carbon fibers, glass fibers, organic fibers such as aramide, PBO (polyparaphenylenebenzbisoxazole), polyamide, polyarylate, and polyester, and steel fibers, used singly or in mixture of a plurality thereof. The reinforcing fiber layer may have a unit weight within a range of from 100 to 600 $g/m^2$.

DESCRIPTION OF THE PREFERRED EMBODIMENTS

Figure 1:
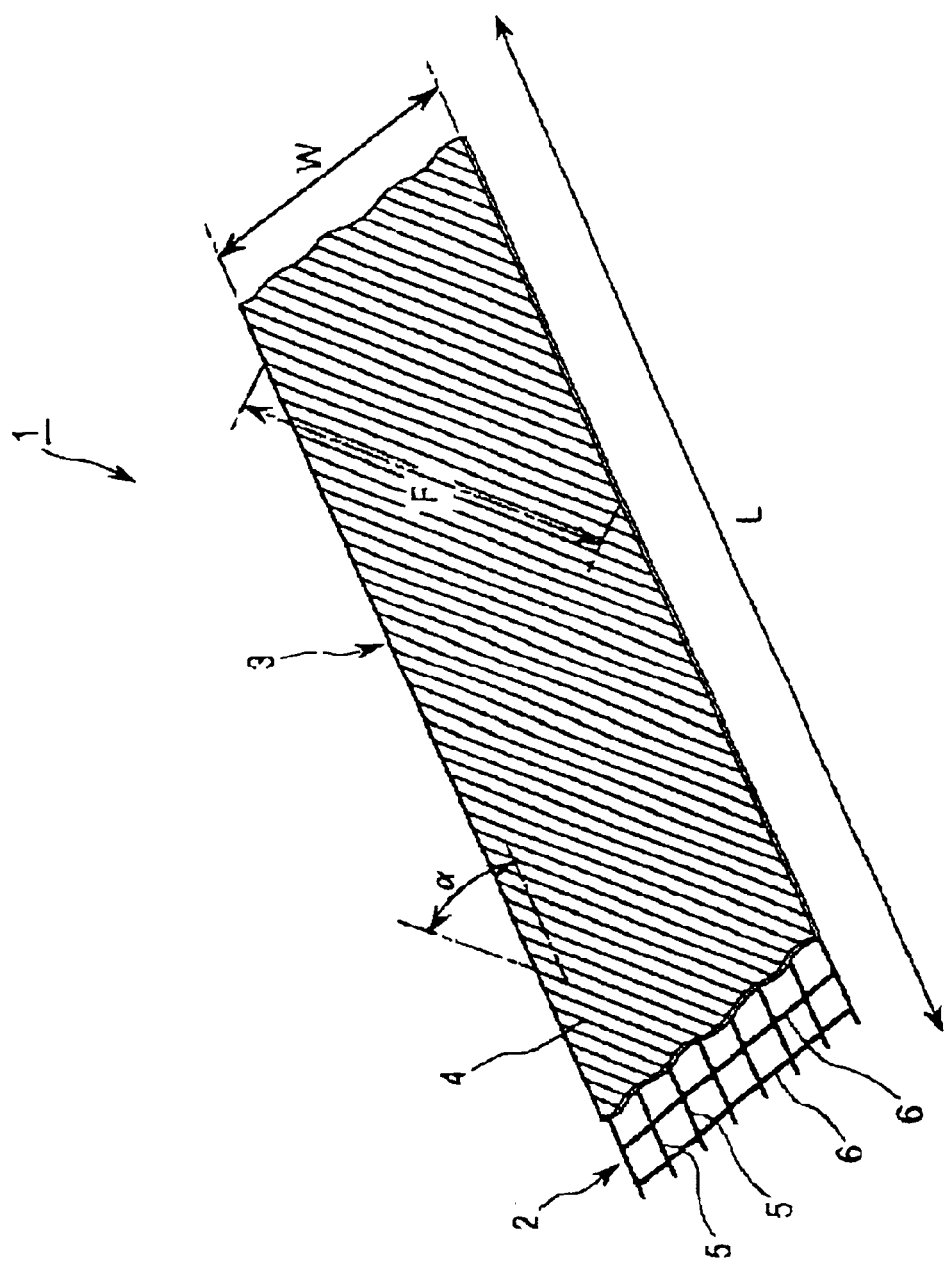
FIG. 1 is a perspective view illustrating an embodiment of the continuous reinforcing fiber sheet of the present invention.
Figure 2:
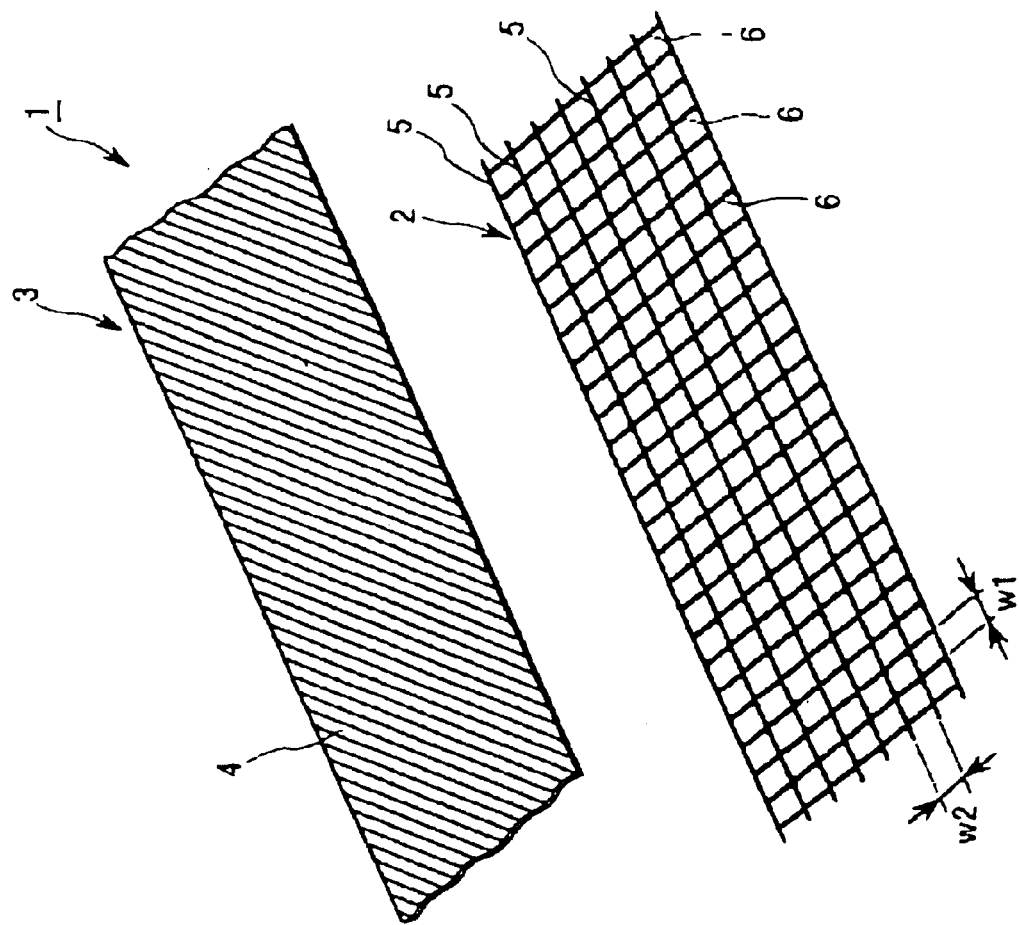
FIG. 2 is an exploded perspective view of the continuous reinforcing fiber sheet of the invention shown in FIG. 1.

The continuous reinforcing fiber sheet and the manufacturing method thereof of the present invention will now be described further in detail with reference to the drawings.
Embodiment 1
FIGS. 1 and 2 illustrate an embodiment of the continuous reinforcing fiber sheet 1 of the invention. In this embodiment, the continuous reinforcing fiber sheet 1 has a resin-penetrable support sheet 2, and a reinforcing fiber layer 3 held by this support sheet 2. The reinforcing fiber layer 3 is arranged at a prescribed angle (α) to the main axis, and is formed with long reinforcing fibers 4 having a certain prescribed length (F) in substance, i.e., except for the leading end and the trailing end of the continuous reinforcing fiber sheet 1. The continuous reinforcing fiber sheet 1 having a sheet shape is not as yet impregnated with a matrix resin. The continuous reinforcing fiber sheet may be impregnated with the matrix resin upon use, or as required, the continuous reinforcing fiber sheet 1 may be kept in the prepreg state which has previously been impregnated with the matrix resin prior to use.

The term "main axis" used herein shall mean an axis running in the longitudinal direction of the continuous reinforcing fiber sheet 1. The resin-penetrable support sheet 2 is arranged on one side of the reinforcing fiber layer 3 in the embodiment shown in FIGS. 1 and 2, but may be arranged on both sides of the reinforcing fiber layer 3.

Figure 11:
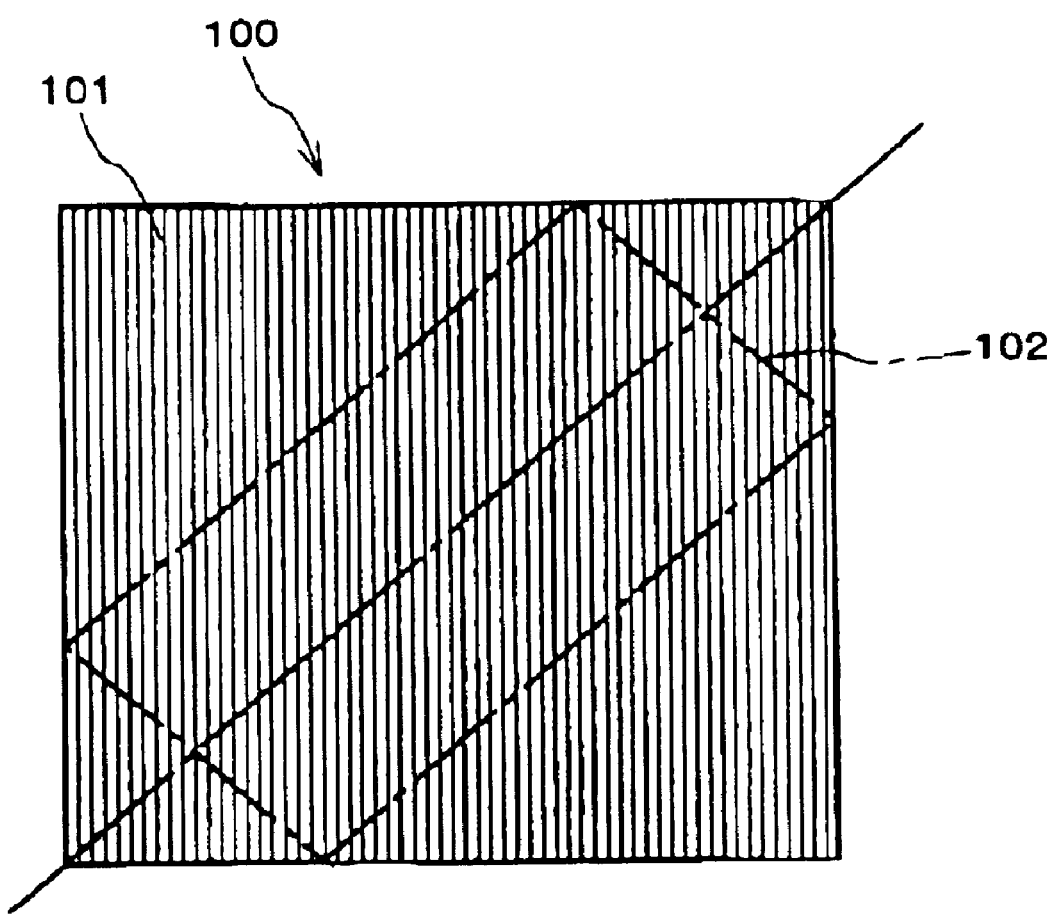
FIG. 11 is a plan view illustrating an example of the unidirectionally oriented reinforcing fiber sheet.

The continuous reinforcing fiber sheet of the invention has a width (W) within a range of from 10 to 150 cm, and a length (L) of at least 10 m. The continuous reinforcing fiber sheet is therefore suitably applicable as a basic material for the pultrusion process which is continuously operated. The conventional angled reinforcing fiber sheet described above with reference to FIG. 11, having an angle of substantially 45°, has in contrast a width (W) of up to 200 cm, and a length (L) of up to 200 cm, and is not applicable, for example, for a continuous forming process such as pultrusion process.

In this embodiment, the reinforcing fiber 4 composing the reinforcing fiber layer 3 comprises PAN-based or pitch-based carbon fibers, glass fibers or organic fibers such as aramide, PBO (polyparaphenylenebenzbisoxazole), polyamide, polyacrylate and polyester, or steel fibers, used singly or in mixture thereof.

The aforementioned resin-penetrable support sheet 2 may be a biaxial or triaxial mesh-shaped sheet or cloth. In this embodiment, as shown in the drawing, a biaxial mesh-shaped sheet is employed. Threads 5 and 6 of the biaxial mesh-shaped sheet have usually an interval (w1 and w2) of 1 to 100 mm, or more preferably, from 2 to 50 mm.

The reinforcing fiber layer 3 is held by the mesh-shaped support sheet 2 by a method, for example, comprising the steps of previously impregnating the surfaces of the warps 5 and wefts 6 with a low-melting-point type thermoplastic resin, laminating the mesh-shaped support sheet 2 onto a side or both sides of the reinforcing fiber layer 3, heating and pressing the same, and melt-adhering the warps 5 and wefts 6 of the mesh-shaped support sheet 2 to the reinforcing fiber layer 3.

Also when using a cloth as the resin-penetrable support sheet 2, the reinforcing fiber layer 3 can be held by the same method.

Embodiment 2

Figure 3:
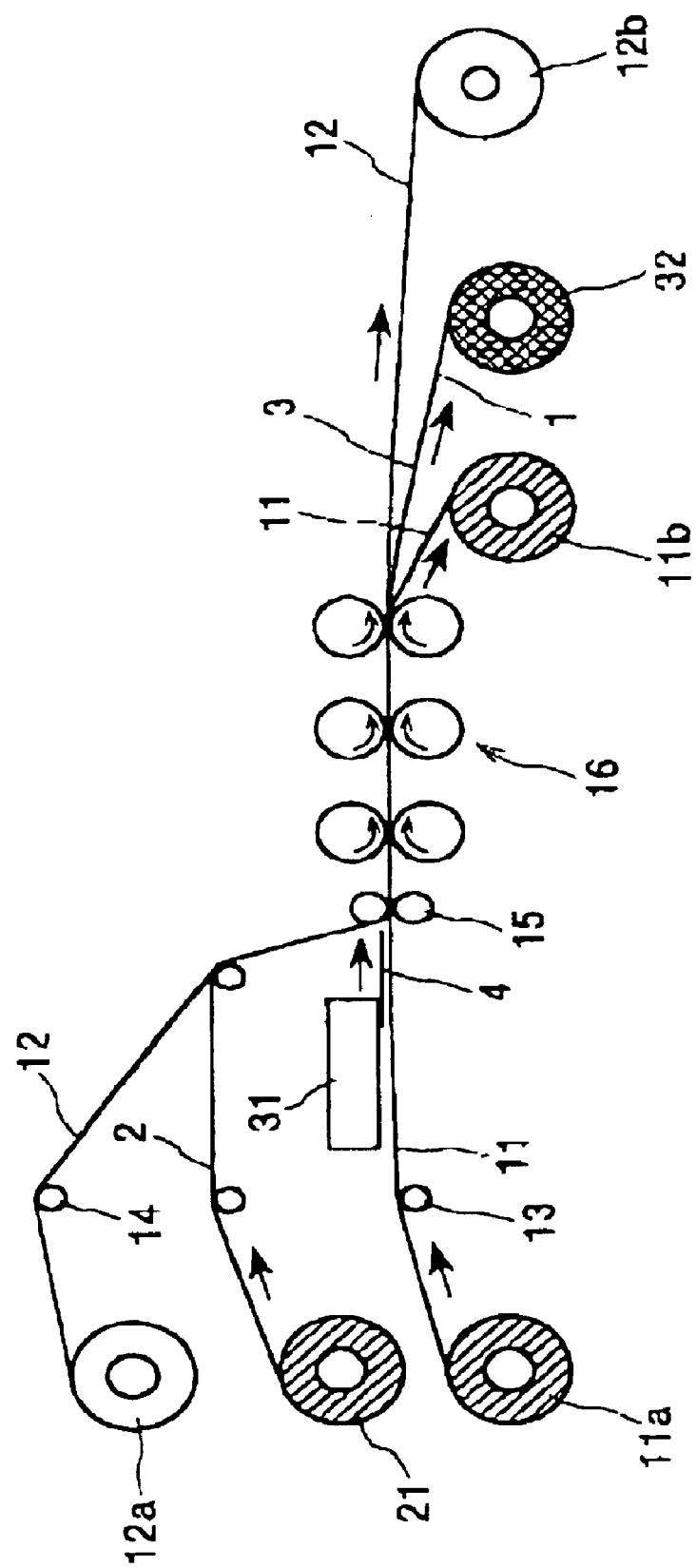
FIG. 3 is a schematic configuration diagram of a manufacturing apparatus of an embodiment for manufacturing the continuous reinforcing fiber sheet of the invention.

The continuous reinforcing fiber sheet 1 of the configuration described as to Embodiment 1 can be manufactured by using, for example, the manufacturing apparatus shown in FIG. 3.

Sheets of first and second release paper 11 and 12 are fed from delivery rolls 11a and 12a and rolled onto take-up rolls 11b and 12b via guide rollers 13 and 14, a feed roller pair 15 and a hot roll unit 16.

Similarly, while the continuous mesh-shaped support sheet 2 formed with the warps and wefts coated with a melt-adhering resin is held between the sheets of first and second release paper 11 and 12, the sheet is fed continuously from the feed roll 21 to the hot roll unit 16 via the feed roller pair 15.

According to this embodiment, furthermore, there is disposed a reinforcing fiber feeder 31 for forming a fiber reinforcing layer 3 by feeding reinforcing fibers 4 between the first release paper 11 and the mesh-shaped support sheet 2.

Therefore, the first release paper 11, the reinforcing fiber layer 3, the mesh-shaped support sheet 2, and the second release paper 12 are supplied to the hot roll unit 16 via the feed roller pair 15.

As a result, the reinforcing fiber layer 3 formed with reinforcing fibers 4 arranged at a prescribed angle to the main axis in the reinforcing fiber feeder 31 is connected to the mesh-shaped support sheet 2 to form a continuous reinforcing fiber sheet 1 which is coiled by a coiler 32. After separation from the continuous reinforcing fiber sheet 1, as described above, the sheets of first and second release paper 11 and 12 are rolled onto take-up rolls 11b and 12b.

Embodiment 3

Figure 4:
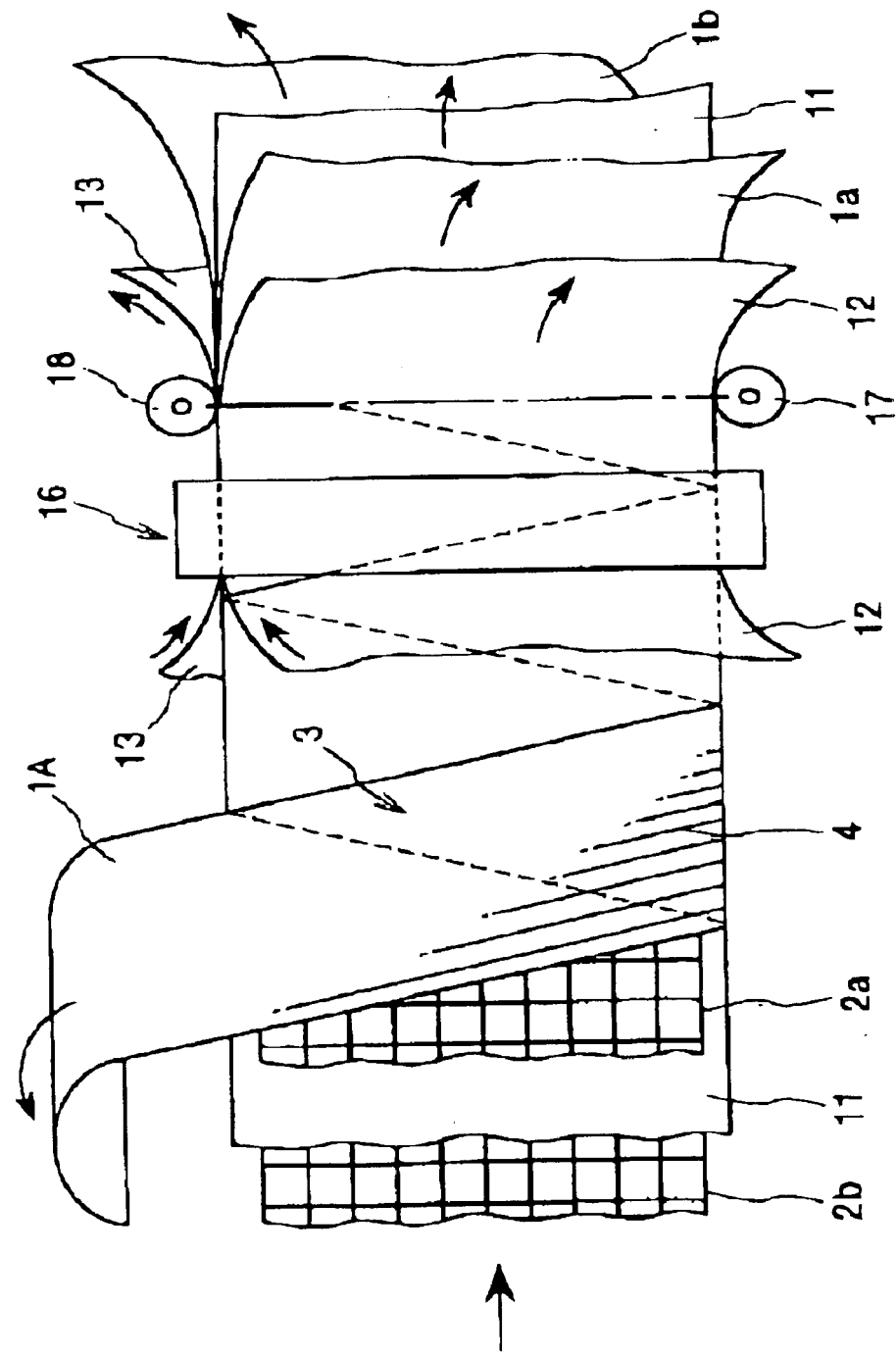
FIG. 4 is a schematic configuration diagram of a manufacturing apparatus of another embodiment for the manufacturing of the continuous reinforcing fiber sheet of the invention.

The continuous reinforcing fiber sheet 1 of the invention may be manufactured by a manufacturing apparatus shown in FIG. 4. In this embodiment, the continuous reinforcing fiber sheet 1 described as to Embodiment 1 is manufactured two (1a and 1b) at a time.

According to this embodiment, the first and second support sheets 2a and 2b are simultaneously supplied from feed rolls (not shown), respectively, in the presence of the sheet of first release paper 11. The warps and the wafts of the support sheets 2a and 2b have been impregnated with the melt-adhering resin.

The continuous reinforcing fiber sheet 1A having the reinforcing fibers 4 arranged in one direction is fed from a reinforcing fiber feeder (not shown), and wound closely and spirally around the first and second support sheets 2a and 2b separated from the first release paper 11, thus forming the reinforcing fiber layer 3. The reinforcing fibers 4 forming the reinforcing fiber layer 3 are arranged at a prescribed angle to the main axis.

The lamination of the first and second support sheets 2a and 2b having the reinforcing fiber layer 3 formed on the surfaces thereof is fed to the hot roll unit 16 while being held between the sheets of second and third release paper 12 and 13. As a result, the reinforcing fiber layer 3 composed of the reinforcing fibers 4 arranged at a prescribed angle to the main axis is connected to the mesh-shaped support sheets 2a and 2b, forming the continuous reinforcing fiber sheets 1a and 1b.

Cutters 17 and 18 are arranged at the exit of the hot roll unit 16. Both edges of the reinforcing fiber sheet 1A which has been spirally wound around the sheets 22a and 22b to form the reinforcing fiber sheets 1a and 1b are cut in the longitudinal direction thereof.

The sheets of first, second and third release paper 11, 12 and 13 are coiled onto a coiling rolls (not shown), respectively. The continuous reinforcing fiber sheets 1a and 1b prepared as described above are separated, and coiled onto the coiling roll (not shown).

In this embodiment, the continuous reinforcing sheet 1 described as to Embodiment 1 is manufactured two at a time (1a and 1b).

Embodiment 4

In the aforementioned embodiment 1, the continuous reinforcing fiber sheet 1 has the configuration in which the resin-penetrable support sheet 2 is adhered to one side or both sides of the reinforcing fiber layer 3, as shown in FIGS. 1 and 2. The continuous reinforcing fiber sheet of the invention may however be of a multi-layer shape by laminating two or more continuous reinforcing fiber sheets having the configuration described for Embodiment 1. In this case, it is desirable to provide at least one resin-penetrable support sheet 2 between the individual continuous reinforcing fiber sheets 1 to form an integral body.

Figure 5:
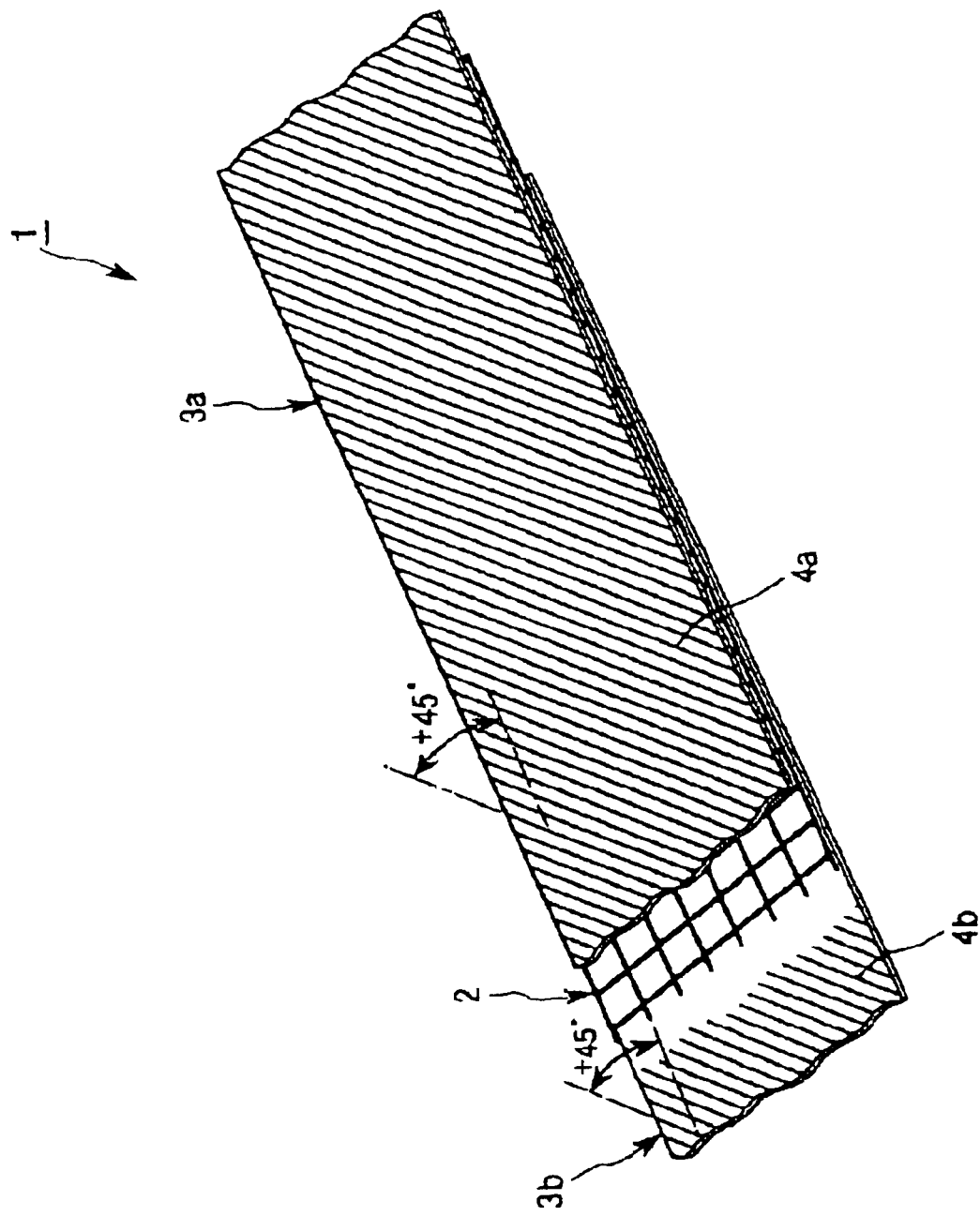
FIG. 5 is a perspective view illustrating another embodiment in which the continuous reinforcing fiber sheet of the invention has a multi-layer configuration.

More specifically, as shown in FIG. 5, the configuration of the sheet 1 may be such that the reinforcing fiber layers (3a and 3b) are provided on both sides of the resin-penetrable support sheet 2. The reinforcing fibers 4a and 4b composing the reinforcing fiber layers 3a and 3b may be arranged in the same direction and at the same angle, for example, at +45° orientation and +45° orientation.

Figure 6:
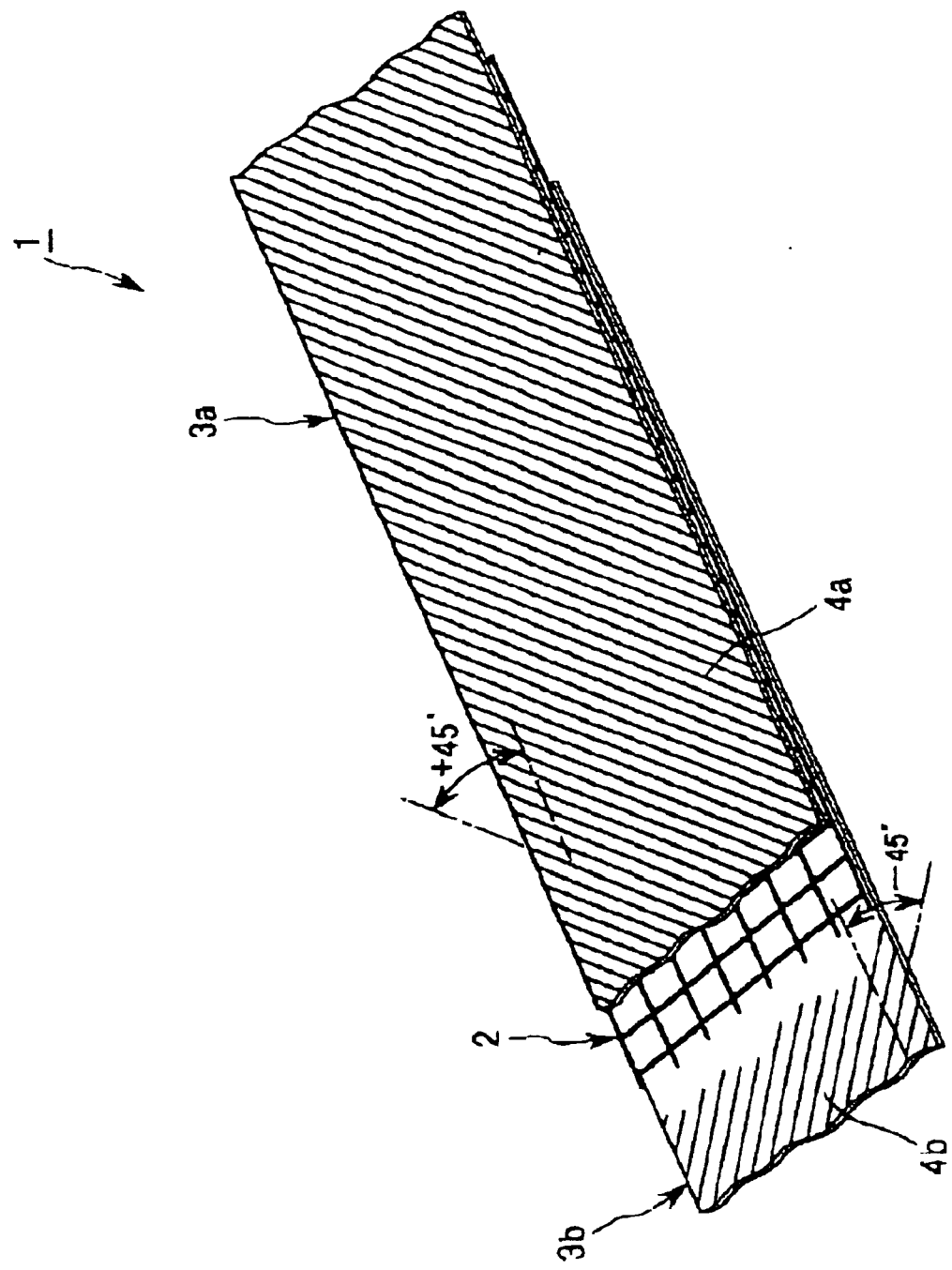
FIG. 6 is a perspective view illustrating another embodiment in which the continuous reinforcing fiber sheet of the invention has a multi-layer configuration.

As shown in FIG. 6, furthermore, the reinforcing fiber 4a composing the reinforcing fiber layer 3a may be arranged, for example, at +45° orientation, and the reinforcing fiber 4b composing the reinforcing fiber layer 3b, in a reverse direction, for example, at −45° orientation.

In the case of the reinforcing fiber sheet 1 of the configuration shown in FIG. 6, for example, when reinforcing a plastic pipe by winding a single layer of the reinforcing fiber sheet 1 of this configuration around the plastic pipe, the fibers at the lap portions of the wound sheet 1 are not oriented in the same orientation, thus making it impossible to fix the fiber orientation. It is not therefore desirable to use the reinforcing fiber sheet 1 of this configuration for the reinforcement by such a method.

When using the reinforcing fiber sheets in lamination, it is necessary to form a symmetric lamination to prevent the bending of the formed product. In other words, in the FRP forming by a general autoclave forming or heat-pressing forming process, the bending of the product inevitably occurs after cooling. Thus, a satisfactory formed product is unavailable unless the lamination is symmetric.

The reinforcing fiber sheet 1 having the configuration shown in FIG. 6 can not be formed into a symmetric lamination if a plurality thereof are laminated. The sheet 1 is not therefore applicable for the preparation of a formed product which is made by a forming process requiring a heat-forming step such as the press forming process or the pultrusion process. When forming with a room-temperature setting type resin, however, as the bending of the formed product hardly occurs, the sheet 1 is applicable also in the configuration shown in FIG. 6.

In the above description of the embodiment, the resin-penetrable support sheet 2 has been explained as being present between the reinforcing fiber layers 3 (3a and 3b), but may be bonded also to the outer surfaces of the reinforcing fiber layers 3 (3a and 3b), in addition to the space between the reinforcing fiber layers 3 (3a and 3b).

Examples of use of the continuous reinforcing fiber sheet 1 of the invention will now be described.

EXAMPLE 1

Figure 7:
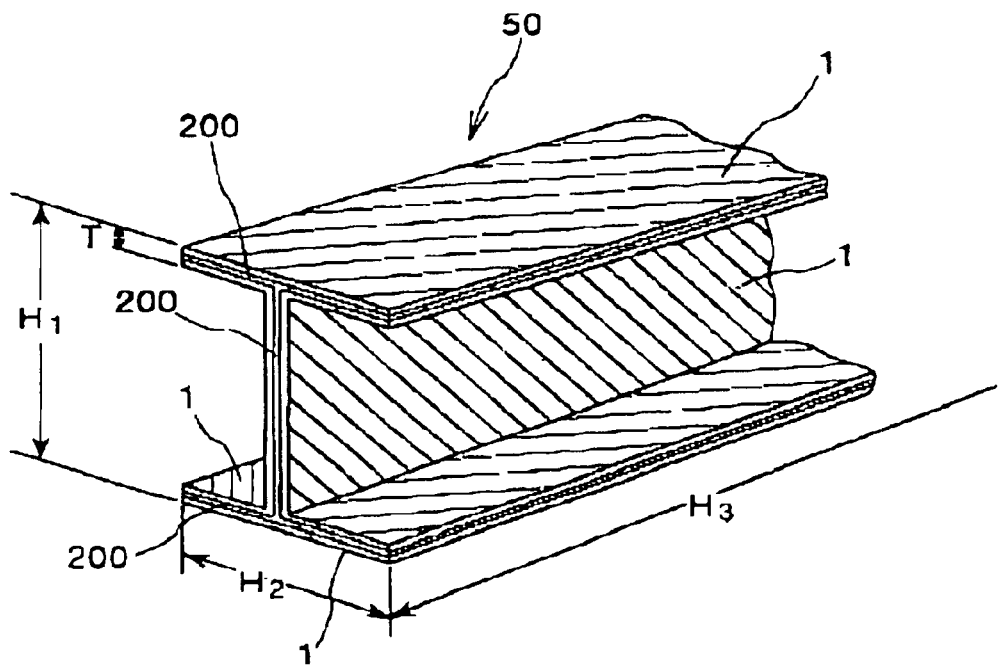
FIG. 7 is a perspective view illustrating an embodiment of an I-type FRP structural member prepared by using the continuous reinforcing fiber sheet of the invention.

An I-type FRP structural member 50 as shown in FIG. 7 was prepared by the pultrusion process by using the continuous reinforcing fiber sheet 1 of the invention.

In this example, the mesh-shaped support sheets 2 were laminated on one side of the fiber reinforcing layer 3 by the manufacturing method described above with reference to FIG. 3, and then heated and pressed. The continuous reinforcing fiber sheet 1 having the configuration shown in FIG. 1 was used.

In the fiber reinforcing layer 3 of the continuous reinforcing fiber sheet 1, PAN-based carbon fiber strands each having a number of converged fiber filaments of 12,000, an average diameter of which is 7 $\mu$m, were used as reinforcing fibers 4 and arranged at a unit weight of 300 g/m². The mesh-shaped support sheet was a biaxial mesh sheet using glass fibers (#300d, one fiber/10 mm) as the warps 5 and wefts 6. Threads of the biaxial mesh sheet had intervals (w1 and w2) of 10 mm.

The warps 5 and the wefts 6 of the mesh-shaped support sheet 2 were impregnated with a thermoplastic resin at a rate of 30 wt. % (resin content).

The thus prepared continuous reinforcing fiber sheet 1 had a width (W) of 50 cm, a length (L) of 100 m and an angle of 45° to the main axis of the reinforcing fibers.

Figure 8:
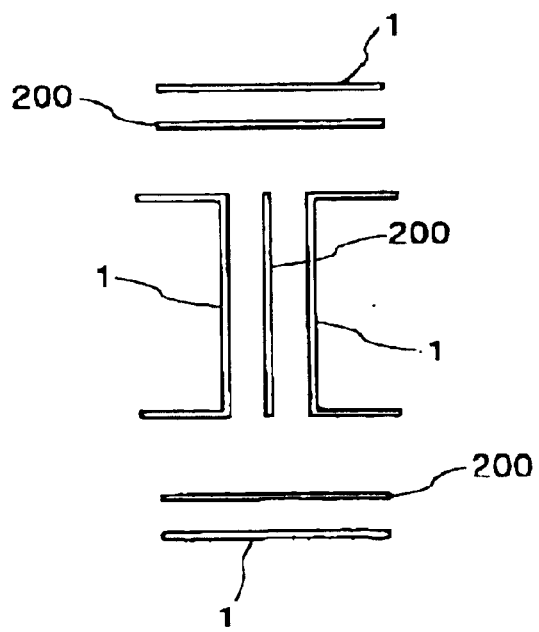
FIG. 8 illustrates an embodiment of a method for arranging reinforcing fiber sheets so as to manufacture the I-type FRP structural member shown in FIG. 7.

As schematically shown in FIG. 8, an I-type FRP structural member 50 was manufactured by assembling continuous reinforcing fiber sheets 1 and unidirectional reinforcing fiber sheets 200 used conventionally into substantially an I-shape, feeding the resultant assembly to a mold, pultrusion-forming the same, and hardening the same. For the continuous reinforcing fiber sheet 1 and the unidirectional reinforcing fiber sheet 200, prepregs previously impregnated with an epoxy resin as the matrix resin were used. The continuous reinforcing fiber sheet 1 and the unidirectional reinforcing fiber sheet 200 had a resin content of 35 wt. %. For the unidirectional reinforcing fiber sheet 200, carbon fibers were used as the reinforcing fibers.

The pultrusion-formed I-type FRP structural member 50 had a height (H1) of 80 mm, a width (H2) of 50 mm, a thickness (T) of 2 mm and a length (H3) of 6 m.

As a comparative example 1, another I-type FRP structural member 50 of the same shape and the same dimensions was prepared from a unidirectional reinforcing fiber sheet 200 alone in place of the continuous reinforcing fiber sheet 1 of the invention.

Table 1 shows mechanical properties of the I-type FRP structural members of Example 1 using the continuous reinforcing fiber sheet 1 of the invention and comparative example 1. The measured data are average values over those of three test pieces.

Table 1 suggests that the I-type FRP structural member using the continuous reinforcing fiber sheet 1 of the invention has a remarkably improved torsional rigidity.

TABLE 1

Torsion strength of I-type FRP structural member

| | Dimensions (mm) | | | | Torsional load (kg) |
|---|---|---|---|---|---|
| | Height | Weight | Thick. | Length | |
| Example 1 | 80 | 50 | 2 | 800 | 18.2 |
| Comparative Example 1 | 80 | 50 | 2 | 800 | 4.5 |

EXAMPLE 2

Figure 9:
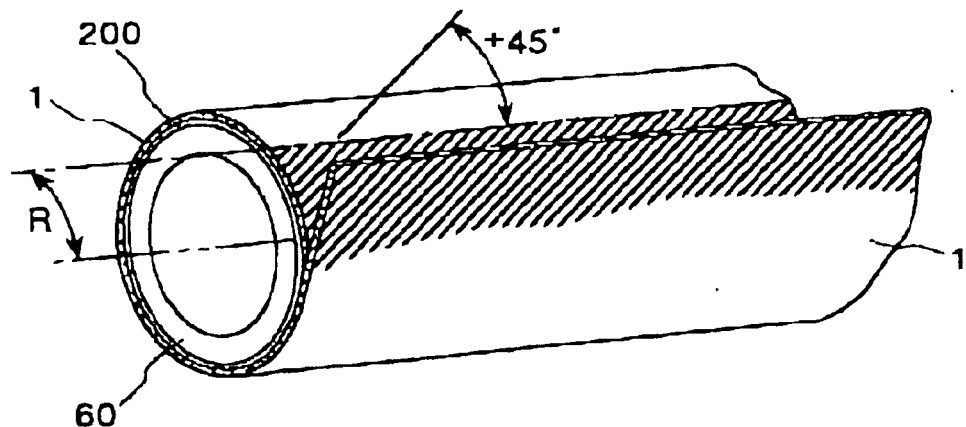
FIG. 9 is a perspective view illustrating an embodiment for reinforcing a plastic pipe by using the continuous reinforcing fiber sheet of the invention.

In Example 2, the same reinforcing fiber sheet 1 as that used in Example 1 was cut into prescribed lengths, and the main axis of the reinforcing fiber sheet 1 was aligned with the longitudinal direction of a plastic pipe 60 as shown in FIG. 9. The pipe 60 was reinforced by winding the cut lengths around the surface of the plastic pipe 60 and impregnating the same with a resin.

More specifically, the plastic pipe 60 used in this example was made of polyethylene and had a diameter of 580 mm and a length of 5 m. First, the surface of this plastic pipe 60 was activated by corona treatment to improve adhesivity to epoxy resin, two layers of one-direction carbon fiber sheet (made by Nippon Steel Composite Co., Ltd.: commercial product name: "TOW SHEET") 200 were affixed to improve bending strength and bending rigidity.

Then, a layer of the reinforcing fiber sheet 1 of an orientation of +45° used in example 1 was attached to the outside of the unidirectional carbon fiber sheet. The lap portion (R) in the circumferential direction was overlapped by 200 mm. The uniformity of fiber direction at the lap portion thus made it possible to fix the reinforcing fiber sheet 1.

Furthermore, a layer of the reinforcing fiber sheet 1 of an orientation of –45° resulting from the reverse direction angle of the reinforcing fibers, although not shown in FIG. 9, was attached to the outside of the 45°-oriented reinforcing fiber sheet 1. In this case as well, the lap portion in the circumferential direction was overlapped by 200 mm, and this permitted the fixing of the reinforcing fiber sheet. It is needless to mention that the +45°-oriented reinforcing fiber sheet 1 used in reverse can serve as a –45°-oriented reinforcing fiber sheet having the reinforcing fibers provided at an angle in the reverse direction.

Impregnation of the one-direction carbon fiber sheet 200, and the +45° or –45°-oriented reinforcing fiber sheet 1 with the matrix resin was conducted whenever the winding of the sheet around the pipe 60 was carried out. The one-direction carbon fiber sheet 200 and the 45°-oriented reinforcing fiber sheet 1 had an amount of resin of 800 g/m2.

In Comparative Example 2, a sheet made by integrally laminating two +45°-oriented and –45°-oriented continuous reinforcing fiber sheets via a mesh-shaped support sheet as shown in FIG. 6, known as a ±45°-oriented double bias continuous reinforcing fiber sheet 1 was used in place of the +45°-oriented and the –45°-oriented continuous fiber sheets having the configuration as shown in FIG. 1.

Table 2 shows mechanical properties of the plastic pipe used in example 2 and comparative example 2 using the continuous reinforcing fiber sheets. It is known from Table 2 that the plastic pipe reinforced by using the continuous reinforcing fiber sheet of example 2 exhibits an improved torsional rigidity.

The cause is that the ±45°-oriented continuous reinforcing fiber sheet cannot be fixed at the lap portion in the circumferential direction formed by overlapping by 200 mm.

TABLE 2

|  | 1st layer | 2nd layer | Lap portion configuration | Thickness | Torsional load (kg) |
|---|---|---|---|---|---|
| Example 2 | +45° sheet | –45° sheet | Fibers in the same direction | 0.5 mm | 28.4 |
| Comparative Example 2 | ±45° sheet |  | Fibers in different directions | 0.6 mm | 19.8 |

More specifically, as is understood from the above description, the continuous reinforcing fiber sheet 1 having the configuration shown in FIGS. 1 and 2 provides an advantage of permitting easy achievement of symmetricity. Unlike the ±45°-oriented double bias continuous reinforcing fiber sheet shown in FIG. 6, the continuous reinforcing fiber sheet 1 of this configuration permits use with a single layer when a single-layer sheet is required, and if two or more layers are necessary, it is possible to use two or more layers in lamination. In this case, by reversing the first-layer continuous reinforcing fiber sheet for use as a second layer, it is possible to change the angular direction of the reinforcing fibers

EXAMPLE 3

In general, shearing reinforcement is mainly used for aseismatic reinforcement of a reinforced concrete post for civil engineering and building purposes. To avoid shearing rupture, the fibers should preferably be oriented in ±45° directions with a view to inhibiting diagonal cracking.

In an existing carbon fiber sheet or the like, however, while there are available unidirectional carbon fiber sheets having carbon fibers aligned in one direction, and cloth-type bidirectional carbon fiber sheets, there is unavailable a carbon fiber sheet having carbon fibers oriented in a 45°-direction, which has never been used in practice.

Figure 10:
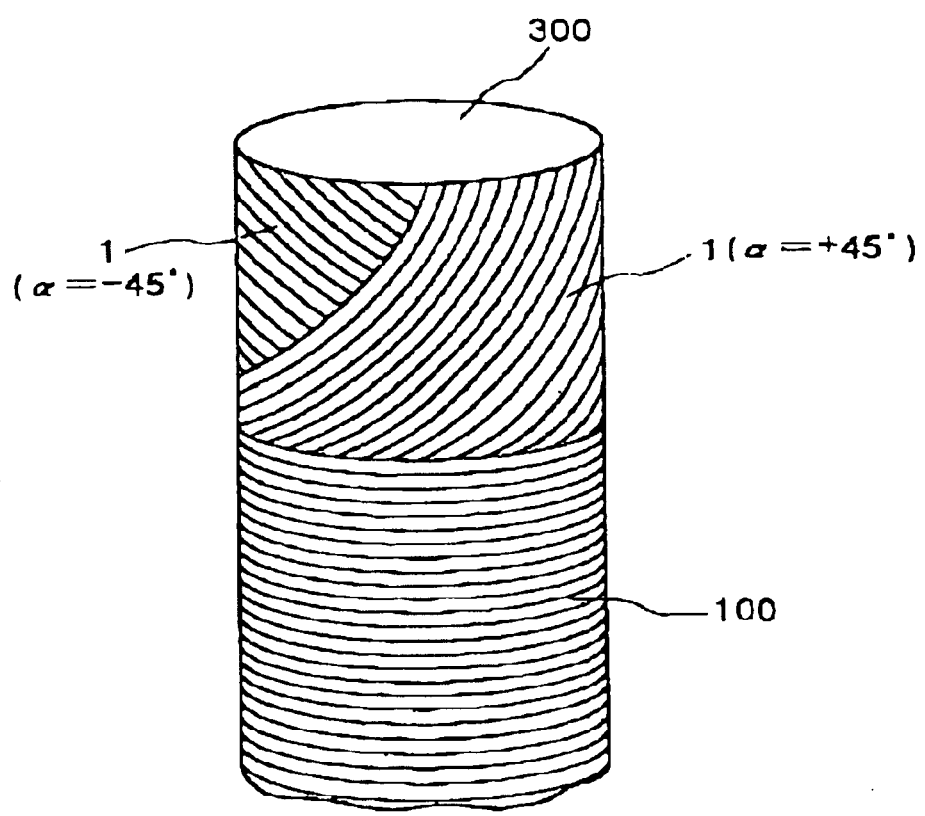
FIG. 10 is a perspective view illustrating an embodiment for aseismatic-reinforcing a reinforced concrete pole by using the continuous reinforcing fiber sheet of the invention.

In this example, as shown in FIG. 10, a –45° fiber reinforcing sheet 1 and a +45° fiber reinforcing sheet 1 of the invention having the configuration, for example, shown in FIG. 1 were affixed around the reinforced concrete post 300 and laminated. Carbon fibers were used as the reinforcing fibers.

Furthermore, to constrain shearing rupture of the post, further lamination is made on the aforementioned laminated fiber reinforcing sheet 1, and in this example, a one-direction carbon fiber sheet 100 having carbon fibers arranged in one direction was bonded in the circumferential direction.

With such a configuration, aseismatic reinforcement of a reinforced concrete post could effectively be achieved.

According to the present invention, as described above, there is provided a sheet-shaped continuous reinforcing fiber sheet, not as yet impregnated with a resin, or in the form of a prepreg comprising a continuous resin-penetrable support sheet, and a reinforcing fiber layer, in which reinforcing fibers composed of long fibers having substantially a certain length, are arranged at a prescribed angle to the longitudinal direction of the resin-penetrable support sheet and also in the longitudinal direction of the resin-penetrable support sheet, and are held by the resin-penetrable support sheet. There are therefore provided the following advantages:

(1) It is possible to manufacture a long fiber-reinforced plastic structural member having a remarkably improved torsional rigidity, in which the reinforcing fibers are arranged at an arbitrary angle to the main axis, which is well applicable for pultrusion-forming without the risk of the reinforcing fibers being dispersed.

(2) When reinforcing an object to be reinforced such as a pipe by winding around the pipe, it is possible to make the fiber orientation uniform at the lap portion in the circumferential direction, to achieve a satisfactory fixing, and to improve the torsional rigidity of the object to be reinforced.

(3) Unlike the double bias continuous reinforcing fiber sheet, the sheet of the invention can be used in lamination if two or more layers are necessary, and it is possible to change the angular direction of the reinforcing fibers by reversing the first-layer continuous fiber sheet for use as a second layer. An advantage of permitting easy achievement of symmetric lamination is provided.

The manufacturing method of the sheet-shaped continuous reinforcing fiber sheet not as yet impregnated with a resin of the invention comprises the steps of: (a) continuously feeding resin-penetrable support sheets; (b) supplying long reinforcing fibers having substantially a certain length at a certain angle to the longitudinal direction of the resin-penetrable support sheet so as to laminate with the resin-penetrable support sheet; and (c) heating and pressing the resin-penetrable support sheet, and a reinforcing fiber layer formed with the reinforcing fibers and laminated with the resin-penetrable support sheet. It is therefore possible to very suitably manufacture the sheet-shaped continuous reinforcing fiber sheet not as yet impregnated with a resin exhibiting the aforementioned various features.

What is claimed is:

1. A reinforcing fiber sheet, not as yet impregnated with a resin, comprising at least one resin-penetrable support sheet having a longitudinal direction and a reinforcing fiber layer, wherein said reinforcing fiber layer is held by said resin-penetrable support sheet and comprises reinforcing fibers which are long fibers having substantially a length F, wherein said reinforcing fibers are arranged substantially at 45° to the longitudinal direction of said at least one resin-penetrable support sheet.

2. A reinforced concrete column comprising a reinforcing fiber sheet according to claim 1 adhered to said concrete column.

3. A multi-layer reinforcing fiber sheet comprising two or more reinforcing fiber sheets laminated into an integral sheet, wherein each reinforcing fiber sheet comprises a resin-penetrable support sheet having a longitudinal direction and a reinforcing fiber layer, wherein said reinforcing fiber layer is held by said resin-penetrable support sheet and comprises reinforcing fibers which are long fibers having substantially a length F and which are arranged substantially at a prescribed nonzero angle to the longitudinal direction of said resin-penetrable support sheet.

4. The multi-layer reinforcing fiber sheet according to claim 3, wherein at least one of said resin-penetrable support sheets is interposed between said two or more reinforcing fiber sheets.

5. The multi-layer reinforcing fiber sheet according claim 3 or 4, wherein said reinforcing fibers forming a reinforcing fiber layer of each of said reinforcing fiber sheets are arranged at a nonzero angle to the longitudinal direction of said resin-penetrable support sheets.

6. The multi-layer reinforcing fiber sheet according to claim 3 or 4, wherein said reinforcing fibers forming the reinforcing fiber layer of each of said reinforcing fiber sheets are arranged at a nonzero angle to the longitudinal direction of said resin-penetrable support sheet different from that of one or more adjacent reinforcing fiber layers.

\* \* \* \* \*